United States Patent Office 3,103,546
Patented Sept. 10, 1963

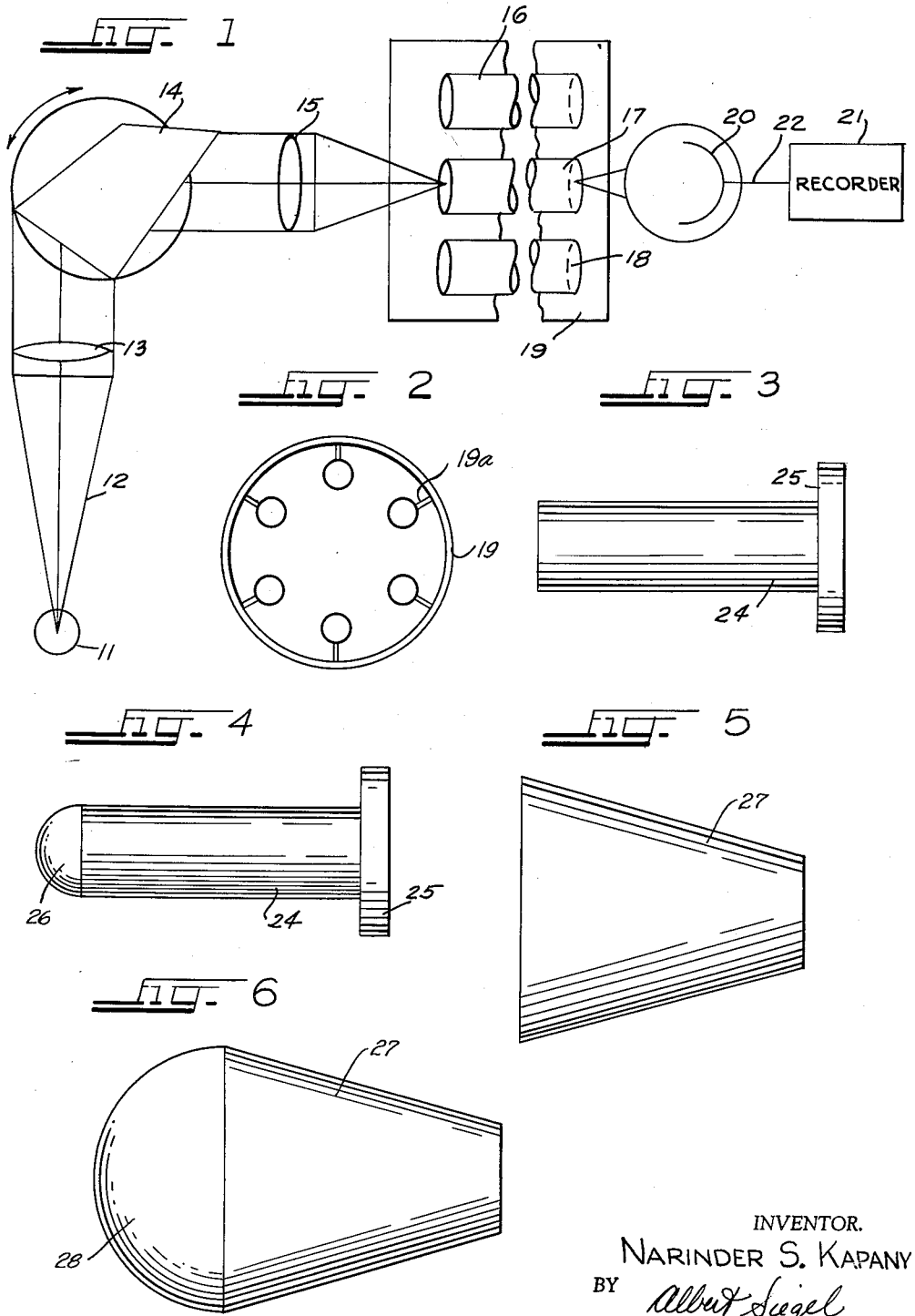

3,103,546
PHOTOREFRACTOMETER
Narinder S. Kapany, Chicago, Ill., assignor, by mesne assignments, to Optics Technology, Incorporated, Belmont, Calif., a corporation of California
Filed Nov. 28, 1958, Ser. No. 776,774
4 Claims. (Cl. 88—14)

The present invention relates to a photorefractometer, and more particularly relates to such a device which employs a dielectric cylinder or cone as a sensor element and is considerably more sensitive to change in refractive index than similarly used devices in the prior art. It especially relates to a photorefractometer which is conveniently useful in the determination of slight changes in the refractive index of a fluid although it of course should be understood that such a device may be used in a process wherein are present comparatively wide range refractive index variations.

When a transparent dielectric cylinder or cone is immersed in a specimen liquid or gas and an axial light cone is condensed at one end thereof the energy transmitted by total internal reflection through such cylinder or cone depends primarily on the difference in refractive index of the dielectric member and that of its surroundings, and thus a change in the index of the surrounding medium is related to a change in the emergent light flux from the dielectric member immersed therein. Such transmission phenomena and its relationship to the determination of the index of refraction of the surrounding medium is utilized in the devices made in accordance with the teachings of the present invention.

It is known that in a light-transparent rod the angles of entrance and emergence of an axial light cone are equal provided that the refractive index across the rod wall allows internal reflections for all light rays within the rod. However, when such index of the surrounding material approaches the value of the index of the material forming the rod there occurs some loss of light due to refraction of those rays which strike the wall at angles less than critical incidence, and when the refractive indices of the dielectric member and its surrounding fluid medium are the same or substantially the same the transmission of light through the dielectric member reaches a minimum. In addition to such phenomena in some embodiments of my invention the phenomena of absorption by the medium is utilized to provide an even more accurate refractive index determination.

In the prior art most closely related to the instant invention there has always existed the problems of accuracy and sensitivity of the refractometers that have been utilized. In addition such refractometers have either been inoperative or extremely insensitive in the determination of the refractive indices of gases; whereas, as will be made evident to those skilled in this particular art such shortcomings are substantially overcome by the herein presented devices.

In view of the foregoing discussion, a primary object of the present invention is to provide a novel photorefractometer which is extremely sensitive to changes in the refractive index of a fluid.

Another object of my invention is to provide novel photorefractometer sensor elements which are extremely more sensitive in their operation than similar elements used in the prior art.

Other objects, features and advantages of my invention will become apparent to those skilled in this particular art from the following detailed disclosure thereof and the accompanying drawings in which:

FIGURE 1 schematically discloses a multiple rod refractometer and generally indicates the overall device of the instant invention;

FIGURE 2 schematically discloses the positioning in section of the dielectric rods within the fluid containing chamber as used in some embodiments herewith;

FIGURE 3 schematically discloses a refractive index sensor element useful herewith;

FIGURE 4 discloses a modification of such sensor element;

FIGURE 5 discloses another modification of such sensor element; and

FIGURE 6 discloses yet another modification of such sensor element.

Referring next to the drawings:

FIGURE 1 schematically discloses a photorefractometer made in accord herewith and provides the background information which is necessary for the operation of the herein claimed sensor elements. In such drawing, a source of light 11 directs a conical light beam 12 through len 13 into a monochromator 14. Such monochromator is adjusted to select the wavelength of the light that is to be used for a particular refractive index determination. From the monochromator the light passes through a focusing lens 15 and from such lens is directed onto the entrance end of one of a graded series of glass rods or various other light-transparent dielectric members 16, 17 and 18 whose refractive indices at the wavelength of operation are accurately known. For purposes of description three rods are shown in the schematic drawing, but in actual operation in some embodiments hereof a multitude of such rods are provided whereas in other embodiments and particularly by the use of the conical sensor elements hereinafter described only one such dielectric member may be utilized. Such rods are positioned in a chamber 19 and are preferably annularly rotatable when a series of rods are to be used whereby each rod is brought into adjustment with the light beam passing through the focusing lens 15 and into the photoreceptor member 20. Such latter member is most simply a photoelectric cell which is connected into a current recorder 21 through electrical lead member 22. Each of these glass rods, i.e., dielectric members, differ one from the other by a known refractive index increment; thus rod 16 has such index of value $n$, rod 17, $n+0.05$, for example, rod 18 $n+0.10$ and so through the entire series of graded rods which are used.

The chamber 19, when used, has light-transparent input and output windows for the passage of light. Such windows are positioned in linear adjustment to enable straight line transmission from the filter means through the dielectric rod being used to the photoreceptor element.

At this point it should be indicated that various filter elements may be used instead of the monochromator 14 discussed above, the selection of the particular filter or other wavelength selecting means being within the ambit of those skilled in this art.

In actual operation the hereindisclosed embodiments of my invention utilize primarily the transmission phenomena discussed above, that is, that light transmission through a dielectric cylinder or cone is dependent upon the respective refractive indices of said cylinder and its surrounding medium. In FIGURE 1 is illustrated one means of carrying out such measurements. Into chamber 19 is first placed the material—either a liquid or gas—of unknown refractive index; either of such positioning may be done statically or inlet and outlet ports may be provided in the chamber and the unknown may be continuously passed therethrough as is the case in continuous flow process control. Parenthetically, in some instances, as for example, the determination of the refractive index of air as a part of a humidity study the chamber is omitted from the overall system. After the unknown medium circumferentially surrounds the sensor members, the rod with the highest refractive index is positioned into the light path between the lens 15 and the photocell 20 and then transmitted energy is measured through all the necessary rods, one by one and when such transmitted energy reaches a minimum the refractive index of the unknown fluid is either equal to or most closely equal to the refractive index of such rod. On the other hand, as soon as the rod index becomes less than the refractive index of the fluid the transmission curve again starts to increase due to grazing-incidence reflections within the rod and thus the point of minimum transmission in all instances is the critical indicating factor in determining the refractive index of the medium surrounding dielectric cylinder.

In FIGURE 2 are shown schematically the positioning of rods 16, 17 and 18 within the chamber 19. Such rods or dielectric cylinders are uncoated and are attached to the circumference of the chamber walls by means of hanger elements 19a or the like.

FIGURES 3 through 6 disclose various transparent dielectric refractive index sensor elements which form the core of my invention. In FIGURE 3 a photoreceptor member 25 abuts directly upon the light-exit end of the cylindrical member 24. Such latter member is utilized as are the rods, 16–18 of FIGURE 1 and photoreceptor member 25 is actuated in the same manner as its like member 20 in such FIGURE 1. As is shown below by such direct abutment feature as between the dielectric cylinder and the photoreceptor there results a considerable increase in the refractive index sensitivity of photorefractometers which utilize such apparatus. While I am not absolutely certain of the theoretical considerations which give rise to the sensivity improvement made available by such construction, apparently such improvement is based upon the fact that a portion of the light rays emerging from or attempting to emerge from the rod are internally reflected as they strike the exit face thereof. If the photoreceptor member is separated from the rod such totally internally reflected rays do not serve to energize the receptor and essentially for all practical purposes are lost. On the other hand, by providing such direct abutment even the reflected rays are utilized in the photoelectric generation of current and therefore, all other things being equal, by the utilization of such a novel feature a considerably greater amount of light actuates the photoelectric cell. Since the sensitivity of the photorefractometer depends to a considerable extent upon the degree of transmission of light through its dielectric members, by increasing the amount of exiting light that is sensed by the herein presented apparatus smaller variations in refractive index may be determined then is feasible by the use of apparatus made in accord with the teachings of the prior art.

FIGURE 4 discloses another improvement to the dielectric refractive index sensor. In such embodiment the entrance end of the cylinder 24 is provided with a hemisphere 26 to better focus the light rays being directed into and through such cylinder. The hemisphere is most preferably formed as a unitary component upon the cylinder, but it may be cemented thereto if such is desired. Again, as will be made evident from the table presented below by the utilization of such a hemispherical entrance member there results a considerable increase in the sensitivity to refractive index variations of photorefractometers utilizing such a sensor element. As in FIGURE 3 in the embodiment of FIGURE 4 the photoreceptor member 25 abuts directly upon the exit face of the cylinder 24.

FIGURES 5 and 6 illustrate a conical sensor element 27 which has been proven extremely more sensitive to refractive index alterations than any similar devices presently available. The greater diameter end represents the light input face whereas from the lesser diameter face the light rays exit. The preferred embodiment of a sensor element is illustrated in FIGURE 6, for here is utilized the hemispherical light input member 28 to provide an even better degree of refractive index sensitivity than the foregoing embodiments hereof. Although it is not shown in the drawings it should be understood that the protoreceptor members 25 are preferably directly abutted against the exit face of such conical sensor elements but because of the sensitivity of such elements it is not absolutely critical.

In order to more fully understand the improvements made available by the utilization of the refractive index sensor elements made in accordance with the teachings of the present invention the following sensitivity table should be considered. In such table the sensitivity is given in relative orders of magnitude and without becoming involved with the detailed mathematical theory involved therein the values represent the relative refractive index changes—i.e., how small a change—that can be determined by the various embodiments of my invention.

Type of sensor:                                         Sensitivity
   (1) Cylinder alone, receptor separated_____ 3.0
   (2) Hemispherical end, cylinder separated receptor _____ 6.8
   (3) Hemispherical end, cylinder abutting receptor _____ 10
   (4) Conical member, abutting receptor_____ 76

From the foregoing it can be seen that the preferred embodiment hereof is 25 times more sensitive than known devices.

In determining the foregoing refractive index sensitivity measurements the rods or conical members were characterized by a refractive index of 1.5 whereas the surrounding liquid medium had a known refractive index of 1.4.

By the use of the hereindisclosed refractive index sensor element various modified procedures may be used to even further increase the range and sensitivity of such devices. For example, by the positioning of an adjustable diaphragm between the light filter and the entrance end of the dielectric member it is possible to cause the transmission of a light cone through the dielectric member to further increase the sensitivity thereof.

It should be understood that the instant sensor elements may be utilized with light absorbing fluids—that such elements may be employed not only in determining real, but also complex refractive index, i.e., both refractive index and light absorption properties, of the medium—and thus my devices may be used in determining gas concentrations and the like.

Various modifications and variations may be effected without departing from the spirit or scope of the novel concepts of the instant invention.

I claim as my invention:

1. A photorefractometer comprising in combination: a light source, wave length selector means through which light emitted from said light source is directed, a photoreceptor member, and a plurality of light-transparent dielectric members which convey light by internal reflection interpositioned between said wave length selector and said photoreceptor member, each of said light-transparent members being adjustable between said wave length selector and said photoreceptor member, each of said light-transparent members varying one from the other by an increment of refractive index and being further characterized by being in conical shape, the larger end of said light-transparent means facing said wave length selector means, said dielectric members transmitting light as a function of the refractive index of its surrounding medium whereby the refractive index of such medium is determined.

2. The photorefractometer as defined in claim 1 wherein said photoreceptor member directly abuts upon the light exit end of each of said light-transparent dielectric members.

3. A photorefractometer comprising in combination: a light source, wave length selector means through which light emitted from said light source is directed, a photoreceptor member, and a light transparent dielectric member which conveys light by internal reflection interpositioned between said wave length selector and said photoreceptor member, said light transparent member being adjustable between said wave length selector and said photoreceptor member, said light transparent member being characterized by being in conical shape, the larger end of which faces said wave length selector means, said dielectric member transmitting light as a function of the refractive index of its surrounding medium whereby the refractive index of such medium is determined.

4. A photorefractometer as defined in claim 3 wherein said photoreceptor member directly abuts upon the light exit end of said light transparent dielectric member.

References Cited in the file of this patent
UNITED STATES PATENTS

| | | |
|---|---|---|
| 2,358,020 | Miller | Sept. 12, 1944 |
| 2,383,347 | Silge | Aug. 21, 1945 |
| 2,483,102 | Pierson | Sept. 27, 1949 |
| 2,569,127 | Eltenton | Sept. 25, 1951 |